United States Patent Office 3,657,232
Patented Apr. 18, 1972

3,657,232
7-[(o-AMINOMETHYLPHENYLTHIO)-ACETAMIDO] CEPHALOSPORANIC ACID
Raymond Urgel Lemieux and Rintje Raap, Edmonton, Alberta, Canada, assignors to R & L Molecular Research Ltd., Edmonton, Alberta, Canada
No Drawing. Filed June 19, 1970, Ser. No. 47,916
Int. Cl. C07d 99/24
U.S. Cl. 260—243 C          7 Claims

ABSTRACT OF THE DISCLOSURE

7-[(o-aminomethylphenylthio)acetamido]cephalosporanic acid and its nontoxic, pharmaceutically acceptable salts are valuable as antibacterial agents, as nutritional supplements in animal feeds and as therapeutic agents in poultry and animals, including man, and are especially useful in the treatment of infectious diseases caused by many Gram-positive and Gram-negative bacteria. 7-[(o-aminomethylphenylthio)acetamido]cephalosporanic acid is prepared, for example, by treatment at 0° C. with trifluoracetic acid of the corresponding compound in which the free amino group is protected with a tert.-butoxycarbonyl group.

BACKGROUND OF THE INVENTION

(1) Field of the invention

The cephalosporin of the present invention possesses the usual attribtues of such compounds and is particularly useful in the treatment of bacterial infections by virtue of its potent activity and ease of absorption upon parenteral administration.

(2) Description of the prior art

Sodium cephalothin is a well-known antibacterial agent which has been widely used in medicine by injection. Many other 7-acyl derivatives of 7-aminocephalosporanic acid have been reported in the patent literature including 7-(p-aminomethylphenylacetamido)cephalosporanic acid (U.S. Pat. 3,382,241), 7-(α-aminophenylacetamido)cephalosporanic acid (Great Britain 985,747 and 1,054,806, and Example 1 of U.S. Pat. 3,364,212, widely known as cephaloglycin), 7-[(p-aminophenylthio)acetamido]cephalosporanic acid (U.S. Pat. 3,422,100), 7-(halophenylthioacetamido)cephalosporanic acids (U.S. Pat. 3,335,-136) and the nearly unlimited number of variations of such compounds encompassed by the generic formulae (and often not otherwise described) of such patents as Netherlands 6902013 (Farmdoc 39172). 7-(p-aminophenylacetamido)cephalosporanic acid is also disclosed in U.S. 3,422,103 and see Farmdoc 25,406.

SUMMARY OF THE INVENTION

This invention comprises the amphoteric compound of the formula

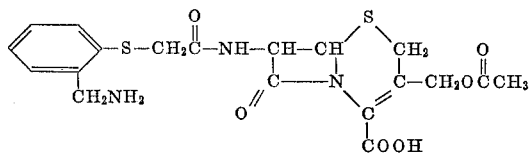

which exists primarily as the zwitterion, and its nontoxic pharmaceutically acceptable salts.

Such salts include the nontoxic carboxylic acid salts thereof, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkylpiperidine, e.g., N-ethylpiperidine and other amines which have been used to form salts with benzylpenicillin; and the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

The amphoteric compound of the present invention is prepared according to the pressent invention by coupling with 7-aminocephalosporanic acid (or a salt or easily hydrolyzed ester thereof including those of U.S. Pat. 3,284,-451 and any of the silyl esters described in U.S. Pat. 3,249,622 for use with 7-aminopenicillanic acid and used in Great Britain 1,073,530) a particular acid or its functional equivalent as an acylating agent for a primary amino group. After coupling, the blocking group is removed to give the desired product. Said acid has the formula

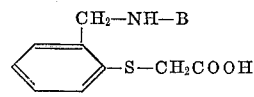

wherein B represents a blocking group of the type used either in peptide syntheses or in any of the numerous syntheses of α-aminobenzylpenicillin from 2-phenylglycine. Particularly valuable blocking groups are a proton, as in the compound of the formula

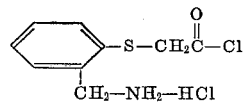

or a β-diketone as in Great Britain 1,123,333, e.g. methyl acetoacetate, in which case the acid containing the blocked amino group is preferably converted to a mixed anhydried, as with ethyl chloroformate, before reaction with 7-aminocephalosporanic acid or a salt thereof to form 7-[(o-aminomethylphenylthio)acetamido]cephalosporanic acid after acid cleavage.

Further to the discussion above of blocking groups used on the free amino group of the sidechain acid during its coupling with 7-aminocephalosporanic acid, the blocking groups is then removed to form the products of the present invention, e.g. the t-butoxy-carbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with 7-aminocephalosporanic acid, functional equivalents include the corresponding acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with 7-aminocephalosporanic acid after first reacting said free acid with N,N'-dimethylchloroformiminium chloride [cf. Great Britain 1,008,170 and Novak and Weichet, Experientia XXI, 6, 360 (1965)] or by the use of enzymes or of an N,N'-carbonyldiimidazole or an N,N']carbonylditriazole [cf. South Africa patent specification 63/2,684] or a carbodiimide reagent [especially N,N'-dicyclohexylcarbodiimide, N,N'-diisopropylcarbodiimide or N-cyclohexyl-N'-(2 - morpholinoethyl)carbodiimide; cf. Sheehan and Hess, J. Amer. Chem. Soc. 77. 1067 (1955)], or of alkylnylamine reagent [cf. R. Buijle and H. G. Viehe, Angew, Chem. International Edition 3, 582 (1964)], or of a ketenimine reagent [cf. C. L. Stevens and M. E. Mond, J. Amer. Chem. Soc. 80, 4065)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e., an amide of the corresponding acid whose amine nitrogen is a member of an quasiaromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carboyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield dimidazolide. The by-product, imidazole, precipitates and may be separated and the imidazolide isolated, but this is not essential. The methods for carrying out these reactions to produce a cephalosporin and the methods used to isolate the cephalosporin so-produced are well-known in the art.

7 - [(o - aminomethylphenylthio)acetamido]cephalosporanic acid after solution in dimethyl sulfoxide (DMSO) followed by dilution with Nutrient Broth was found in duplicate experiments to exhibit the following minimum inhibiting concentrations (M.I.C.) in mcg./ml. versus the indicated microorganisms as determined by overnight incubation at 37° C. by Tube Dilution.

|  | Run Number | |
|---|---|---|
| Organism | 1 | 2 |
|  | M.I.C. in mcg./ml. | |
| D. pneumoniae | .04 | .06 |
| St. pyogenes A9604 | .02 | .03 |
| S. aures Smith | .08 | .13 |
| S. aureus Smith 50% serum | .08 | .25 |
| S. aureus BX-1633-2 | .16 | .25 |
| Sal. enteritidis | <.5 | .3 |
| E. coli Juhl (A15119) | <.5 | .6 |
| E. coli | <.5 | 2.5 |
| K. pneumoniae | <.5 | .6 |
|  | <.5 | 1.3 |
| Pr. mirabilis | <.5 | .6 |
| Pr. morganii | >250 | 125 |
| Ps. aeruginosa | >250 | >250 |
| Scr. marcescens | >250 | >250 |

7 - [(o - aminomethylphenylthio)acetamido]cephalosporanic acid was generally considerably more potent in such tests than 7-[(p-aminomethylphenylthio)acetamido] cephalosporanic acid versus most strains of E. coli and Proteus in vitro, that is, it was frequently four times as potent and almost always twice as potent. This test also indicated that 7-[(o-aminomethylphenylthio)acetamido] cephalosporanic acid was not susceptible to staphylococcal β-lactamase and was not significantly bound to human serum.

7 - [(o - aminomethylphenylthio)acetamido]cephalosporanic acid was well absorbed in mice upon parenteral, but not oral, administration. Blood levels in mice after intramuscular administration of 10 mgm./kg. were about equal to those obtained with cephalothin. A lower minimum dose (CD$_{50}$) of 7-[(o-aminomethylphenylthio) acetamido]cephalosporanic acid than of cephalothin was required by subcutaneous administration in two doses to cure 50% of groups of mice infected in Str. pyogenes (A9604) or E. coli Juhl (A15119).

In the treatment of bacterial infections in man, the compounds of this invention are administered parenterally, in accordance with conventional procedures for antibiotic administration, in an amount of from about 5 to 200 mg./kg./day and preferably about 5–20 mg./kg./day in divided dosage, e.g., three to four times a day. They are administered in dosage units containing, for example, 125 or 250 or 500 mg. of active ingredient with suitable physiologically acceptable carriers or excipients. The dosage units are in the form of liquid preparations such as solutions or suspensions.

The following examples are given in illustration of, but not in limitation of, the present invention. All temperatures are in degrees centigrade. "Hour" and "hours" are abbreviated as "h."

DESCRIPTION OF THE PREFERRED EMBODIMENTS.—EXAMPLE 1

The preparation of 7-[(o-aminomethylphenylthio) acetamido]cephalosporanic acid

This cephalosporin was prepared by the following sequence of reactions:

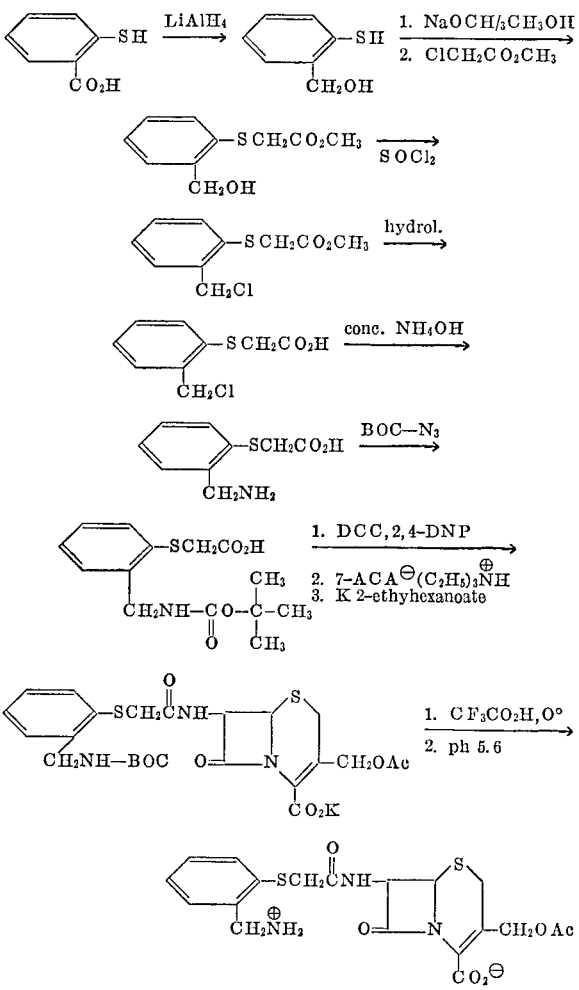

o-Mercaptobenzyl alcohol

A solution of thiosalicylic acid (154.0 g., 1.0 mole) in a mixture of anhydrous ether (1 l.) and tetrahydrofuran (250 ml.) was added dropwise to a stirred suspension of lithium aluminum hydride (42.0 g., 1.1 mole) in 1 l. of anhydrous ether over a period of 2 h. When the addition was completed the reaction mixture was heated under reflux for an additional 4 h. and was then left overnight. After the excess of lithium aluminum hydride was destroyed by the addition of some ethyl acetate, the mixture was poured into 1500 ml. of ice-cooled 3 N hydrochloric acid and stirred for 30 minutes. The layers were separated and the aqueous layer extracted with two 200 ml. portions of ethyl acetate. The combined organic layers were dried, concentrated and distilled to give 105.0 (75%) of product, B.P. 94–96° (0.2 mm.), M.P. 30–32°; reported: B.P. 85° (10⁻³ mm.), M.P. 30–31° [R. Grice and L. N. Owen. J. Chem. Soc., 1947 (1963)] The distillation residue consisted of the starting thiosalicylic acid (28.0 g.).

Methyl (o-hydroxymethylphenylthio)acetate o-Mercaptobenzyl alcohol (91.7 g., 0.655 mole) was added to a solution of sodium methoxide, prepared from 15.1 g. (0.655 g. at) of sodium, in 500 ml. of methanol followed by the dropwise addition of a solution of methyl chloroacetate (71.1 g., 0.655 mole) in 100 ml. of methanol. The reaction mixture was heated under reflux for 1 h., cooled and filtered. The filtrate was concentrated and the residue taken up in ether. The ether solution was washed with water, dried and concentrated to give 128.0 g. (92%) of the crude product, which could be used directly for the next step. In a small-scale reaction this product was distilled to give a 84% yield of colorless liquid, B.P. 136–138° (0.2 mm.). The infrared spectrum contained the characteristic hydroxyl absorption at 3600–3200 cm.⁻¹ and a carbonyl band at 1725 cm.⁻¹.

Methyl (o-chloromethylphenylthio)acetate

The crude methyl (o-hydroxymethylphenylthio)acetate (128.0 g., 0.604 mole) was treated at 0° with 250 ml. of thionyl chloride. The mixture was left at 0° for 30 minutes, then at room temperature for another 30 minutes. The excess of thionyl chloride was removed and the residue distilled in vacuo to give 95.5 g. (69%) of yellow colored liquid, B.P. 127–130° (0.1 mm.).

(o-Chloromethylphenylthio)acetic acid

Methyl (o-chloromethylphenylthio)acetate (113.9 g., 0.493 mole (was dissolved in a mixture of acetic acid (1 l.) and 6 N hydrochloric acid (550 ml.) and left at room temperature for 18 h. The mixture was concentrated to approximately half its original volume, diluted with 200 ml. of water, cooled and filtered. The solid was washed with ice-water, dried and recrystallized from ethyl acetate-n-hexane (1:2) to give 84.8 g. (80%) of white needles, M.P. 116–118°. The n.m.r. spectrum (in CDCl₃) contained a broad singlet at τ −1.3 (CO₂H), a multiplet at τ 2.3–2.7 (phenyl protons) and singlets at τ 5.16 (—CH₂Cl) and 6.32 (—S—CH₂—) with an integrated area ratio of 1:4:2:2 respectively).

(o-Aminomethylphenylthio)acetic acid (o-Chloromethylphenylthio)acetic acid (84.8 g., 0.392 mole) was added rapidly with stirring to 1 l. of ice-cooled ammonium hydroxide. The mixture was left at room temperature for 16 h. and was then concentrated to dryness. The solid residue was treated with 200 ml. of methanol, cooled and filtered. The solid was washed with methanol and dried: 39.1 g. of white solid, M.P. 182–186° (dec.). By concentrating the filtrate again to dryness and treating the residue with 100 ml. of methanol, etc., a second crop (16.9 g.), M.P. 182–190° (dec.), of the product was obtained. Total yield: 56.0 (73%). The infrared spectrum (Nujol) showed the characteristic amino acid absorption at approximately 1550 cm.⁻¹. The n.m.r. spectrum (in trifluoroacetic acid) contained a multiplet at τ 2.2–2.7, phenyl-protons and

a quartet at τ 5.27

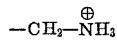

coulpings constant J=5.5 Hz.) and a singlet at τ 5.97 (—S—CH₂—) with an integrated area ratio of 7:2:2 respectively).

(o-tert-Butoxycarbonylaminomethylphenylthio) acetic acid

To a stirred and ice-cooled solution of (o-aminomethylphenylthio)acetic acid (19.7 g., 0.10 mole) and triethylamine (24.2 g., 0.24 mole) in 200 ml. of water was added a solution of tert.-butoxycarbonyl azide (17.2 g., 0.12 mole) in 100 ml. of tetrahydrofuran. The reaction mixture was stirred at room temperature for 16 h. and was then concentrated under reduced pressure to remove the tetrahydrofuran. The aqueous solution was washed twice with ether, layered with 150 ml. of ether, cooled in ice and adjusted to pH 2.5 with 3 N hydrochloric acid. The mixture was filtered and the insoluble white solid washed with ethyl acetate. The layers of the combined filtrate and washings were separated and the organic layer dried. Removal of the solvent yielded 17.4 g. (59%) of oily residue which slowly crystallized upon cooling, M.P. 64–69° (after washing with cold ether). The oil was used for the next step without further purification.

Potassium 7-[(o-tert-butoxycarbonylaminomethylphenylthio)acetamido]-cephalosporanate N,N'-dicyclohexylcarbodiimide (12.2 g., 0.059 mole) was added in one portion to an ice-cooled solution of (o-tert-butoxycarbonylaminomethylphenylthio)acetic acid (17.4 g., 0.059 mole) and 2,4-dinitrophenol (10.9 g., 0.059 mole) in 120 ml. of ethyl acetate. The mixture was left at room temperature for 1 hour, then the N,N'-dicyclohexylurea was filtered off and the solvent removed from the filtrate, leaving the activated ester as a viscous yellow oil. A solution of 7-aminocephalosporanic acid (16.0 g., 0.059 mole) and triethylamine (12.1 g., 0.12 mole) in 120 ml. of methylene chloride was added, with ice-cooling, to the crude activated ester and the reaction mixture left at room temperature for 16 h. A small amount of insoluble material was removed by filtration, followed by the addition of ether to the filtrate. The precipitated viscous oil was twice redissolved in methylene chloride (75 ml.) and reprecipitated with ether (250 ml.) and was then dissolved in methanol (75 ml.). A 2.4 M solution of potassium 2-ethylhexanoate in n-butyl alcohol (25 ml.) was added. After the addition of ether (200 ml.) the yellow solid was filtered off, washed thoroughly with ether and dried in vacuo over P₂O₅; yield: 28.2 g. (81%). The infrared and n.m.r. spectra were in agreement with the assigned structure. The purity of the material was estimated at 75%.

7[(o-aminomethylphenylthio)acetamido]cephalosporanic acid

A solution of the potassium salt of the BOC-protected cephalosporin (23.6 g., 0.040 mole) in 200 ml. of water was layered with 300 ml. of ether and with ice-cooling and stirring brought to pH 3.0 by the addition of dilute hydrochloric acid. A large amount of a sticky ether-insoluble solid precipitated which was extracted with ethyl acetate (300 ml). From the ether and ethyl acetate solutions were obtained, after drying (MgSO₄) and removal of the solvents, 18.5 g. of solid foam. This was treated at 0° with 85 ml. of trifluoroacetic acid. The solution was left at 0° for 1 h., followed by the addition of ether. The solid trifluoroacetate salt was collected by filtration, washed with ether and dried. The white solid (13.0 g.) was treated with 75 ml. of water and the insoluble material removed by a filtration through diatomaceous earth ("Celite"). The filtrate was adjusted to pH 5.6 with dilute ammonium hydroxide and again filtered through "Celite" to remove a small amount of precipitate. The pale yellow filtrate was cooled at 0° for 1 h., resulting in the formation of a voluminous white precipitate which was collected by filtration and washed with ice-water, methanol and ether respectively. The material was dried in vacuo over P₂O₅ and amounted to 3.7 g. of 7[(o-aminomethylphenylthio)acetamido]cephalospranic acid. An additional 0.3 g. was obtained when the filtrate was further concentrated. Total yield: 4.0 g. (22%). The infrared spectrum (Nujol mull) contained sharp bands at 3250, 1770, 1730 and 1650 cm.$^{-1}$, ascribed to the amide NH, $\beta$-lactam carbonyl, acetoxy carbonyl and the amide carbonyl respectively. The n.m.r. spectrum (in trifluoroacetic acid) also fully agreed with the assigned structure. The purity was estimated at 95% or more.

EXAMPLE 2

7-[(o-aminomethylphenylthio)acetamido]cephalosporanic acid

A synthesis of this cephalosporin is outlined by the following reaction scheme:

reduced pressure. A solution of 7-aminocephalosporanic acid (1.30 g., 0.0050 mole) (7-ACA) and triethylamine (1.01 g., 0.010 mole) in 10 ml. of methylene chloride is added to the residue consisting of the crude activated ester cooled at 0°. The reaction mixture is left at room temperature for 4.5 h., then the solution is diluted with ether. The oily precipitate is twice redissolved in methanol (15 ml.). The methanol solution is treated with 2.5 ml. of a 2.3 M solution of potassium 2-ethylhexanoate in n-butanol, followed by the addition of ether. The solid precipitate is filtered off and suspended in 30 ml. of methanol. After the addition of ether the product is collected by filtration and dried to give solid potassium 7-{[o-(p'-nitrocarbobenzoxyaminomethyl) phenylthio] acetamido} cephalosporanate.

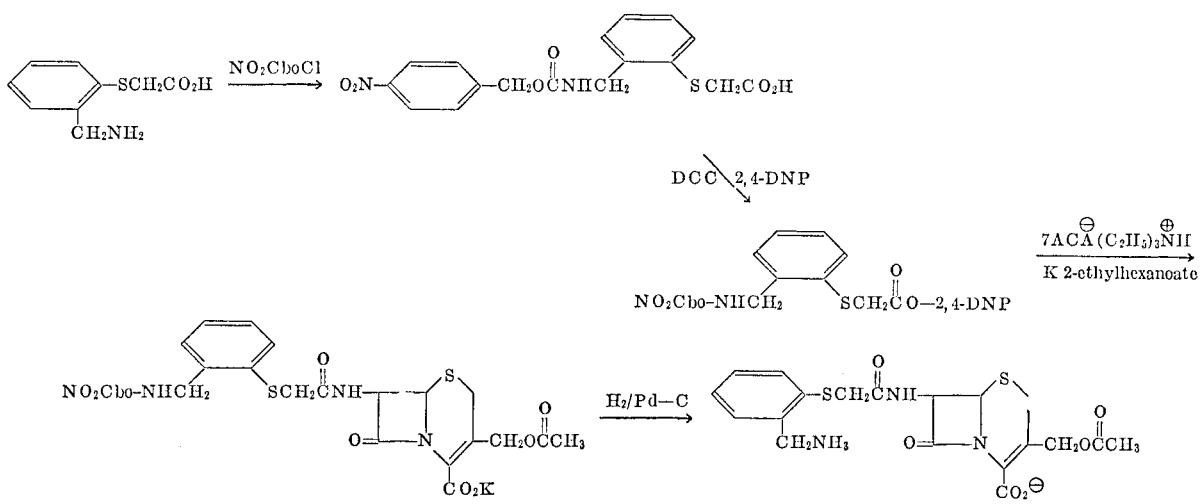

[o-(p'-nitrocarbobenzoxyaminomethyl)phenylthio]acetic acid

To a stirred suspension of (o-aminomethylphenylthio)-acetic acid (4.53 g., 0.023 mole) in 120 ml. of water is added 1 N aqueous sodium hydroxide until the solution attains pH 10. The clear solution is diluted with 80 ml. of THF (tetrahydrofuran). Next a solution of p-nitrobenzyl chlorofromate (NO$_2$CboCl) (5.60 g., 0.026 mole) is added dropwise with stirring at room temperature in approximately 15 minutes. By the simultaneous addition of 1 N aqueous sodium hydroxide the pH is controlled at 7–9. When the addition is completed the solution is extracted with two 100 ml. portions of ethyl acetate. The aqueous solution is cooled and acidified with 20 ml. of 3 N aqueous sulfuric acid. The precipitated oil is extracted with ethyl acetate (2× 100 ml.). After drying (MgSO$_4$), the ethyl acetate solution is concentrated to a volume of 50 ml. and cooled to give a white, solid [p-(p'-nitrocarbobenzoxyaminomethyl)phenylthio]acetic acid.

Potassium 7-{[o-(p-nitrocarbobenzoxyaminomethyl) phenylthio]acetamido}cephalosporanate N,N'-dicyclohexylcarbodiimide (1.03 g., 0.0050 mole) (DCC) is added to a cold solution of [o-(p'-nitrocarbobenzoxyaminomethyl)phenylthio]acetic acid (1.88 g., 0.0050 mole) and 2,4-dinitrophenol (0.92 g., 0.005 mole) (2,4-DNP) in 10 ml. of anhydrous THF. The mixture is left at room temperature for 1 h., then the N,N'-dicyclohexylurea is filtered off and the filtrate containing the crude activated ester is concentrated to dryness under 7-[(o-aminomethylphenylthio)acetomido]cephalosporanic acid A mixture of the protected cephalosporin potassium 7 - {[o - (p' - nitrocarbobenzoxyaminomethyl)phenylthio]acetomido}-cephalosporanate (3.0 g., 0.0045 mole). 10% palladium on carbon (1.5 g.) and water (50 ml.) is hydrogenated at atmospheric pressure for 7 h., then the reaction mixture is filtered through diatomaceous earth ("Celite"). The filtrate is cooled in ice and brought to pH 2.0 with dilute hydrochloric acid, then filtered again through "Celite." The pale yellow clear filtrate is adjusted to pH 5.9 with dilute aqueous sodium hydroxide and concentrated to dryness under reduced pressure. The solid residue is washed successively with one 4 ml. portion and two 2 ml. portions of ice-water, then dried in vacuo over P$_2$O$_5$ to give solid 7-[(o-aminomethylphenylthio)acetamido]cephalosporanic acid.

EXAMPLE 3

(o - Tert. - butoxycarbonylaminomethylphenylthio)acetic acid can be prepared in good yield from tert.-butoxycarbonyl azide and the amino acid by using triethylamine as the base.

The BOC-amine acid reacts with thionyl chloride in the presence of triethylamine (methylene chloride as solvent) or pyridine (benzene as solvent) to give the BOC-amino acyl chloride, which can be directly coupled with 7-ACA in methylene chloride solution in the presence of triethylamine. The protecting group can subsequently be removed by treatment with cold trifluoroacetic acid.

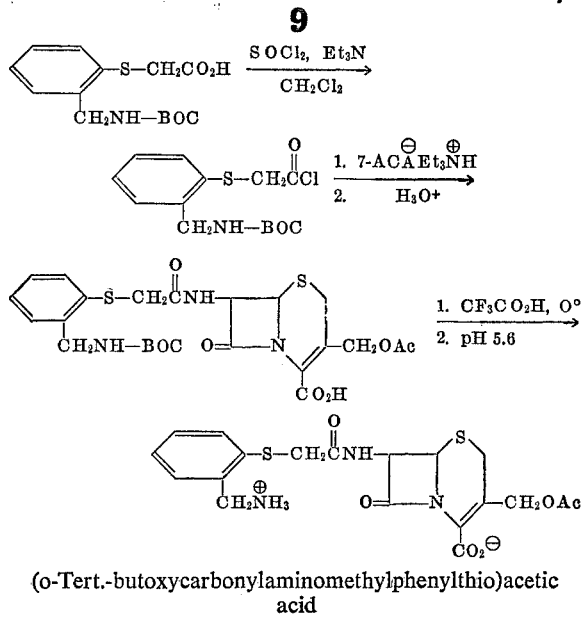

(o-Tert.-butoxycarbonylaminomethylphenylthio)acetic acid

To a stirred and ice-cooled solution of (o-aminomethylphenylthio)acetic acid (7.9 g., 0.040 mole) and triethylamine (10.0 g., 0.10 mole) in 100 ml. of water is added, in one portion, a solution of tert.-butoxycarbonyl azide (7.2 g., 0.050 mole) in 75 ml. of tetrahydrofuran. The mixture is stirred at room temperature for 16 hours. Most of the tetrahydrofuran is removed under reduced pressure. The aqueous solution is washed with ether, then layered with 125 ml. of ether and under stirring and cooling the solution is acidified to pH 2.5 with dilute hydrochloride acid. The layers are separated and the aqueous layer is extracted with an additional 150 ml. of ether. The combined ether solutions are dried (MgSO$_4$) and concentrated to dryness, giving (o-tert.-butoxycarbonylaminomethylphenylthio)acetic acid as sirupy residue sufficiently pure for the next step.

7[(o-aminomethylphenylthio)acetamido]cephalosporanic acid

A solution of thionyl chloride (3.00 g., 0.025 mole) in 25 ml. of methylene chloride is added dropwise in 15 minutes to a stirred and ice-cooled solution of (o-tert.-butoxycarbonylaminomethylphenylthio)acetic acid (7.43 g., 0.025 mole) and triethylamine (2.73 g., 0.027 mole) in 50 ml. of methylene chloride. When the addition is completed the mixture is left at 0° for an additional 30 minutes and is then added dropwise in 10 minutes to a stirred solution of 7-aminocephalosporanic acid (6.80 g., 0.025 mole) and triethylamine (5.05 g., 0.050 mole) in 50 ml. of methylene chloride cooled at −20 to −30°. The reaction mixture is allowed to warm up gradually in one hour and is then treated with 75 ml. of water. With stirring and ice-cooling 25 ml. of 1 N hydrochloride acid is added. The layers are separated and the aqueous layer is extracted with an additional 25 ml. of methylene chloride. The combined methylene chloride solutions are dried (MgSO$_4$) and concentrated to dryness. The residual foam (13.0 g.) is added in portions with stirring to 60 ml. of trifluoroacetic acid cooled in ice. When the addition is completed (10 minutes) the reaction mixture is cooled at 0° for an additional 30 minutes and is then treated with 200 ml. of ether. The precipitated salt is collected by filtration, washed with ether and treated with 150 ml. of water. The mixture is filtered through diatomaceous earth ("Celite") and the filtrate adjusted to pH 5.6 with dilute ammonium hydroxide, followed by another filtration through "Celite." The filtrate is concentrated to dryness under reduced pressure and the solid residue treated with 20 ml. of ice-water. The solid 7[(o-aminomethylphenylthio)acetamido]cephalosporanic acid is collected and successively washed with ice-water (2× 10 ml.), methanol (2× 20 ml.) and ether.

EXAMPLE 4

7-[(o-aminomethylphenylthio)acetamido]-cephalosporanic acid hydrochloride

A suspension of the zwitterionic form of 7[(o-aminomethylphenylthio)acetamido]cephalosporanic acid (0.361 g., 0.8 mmole) in 3 ml. of methanol is cooled in ice and treated with a few drops of concentrated hydrochloric acid until a clear solution is obtained. The hydrochloride precipitates as a pale brown colored solid upon the addition of ether and is collected by filtration and dried in vacuo over P$_2$O$_5$.

EXAMPLE 5

Sodium 7-[(o-aminomethylphenylthio)acetamido] cephalosporanate

To a stirred suspension of the zwitterionic form of 7 - [(o - aminomethylphenylthio)acetamido]cephalosporanic acid (0.361 g., 0.8 mmole) is added 1 N aqueous sodium hydroxide at room temperature until a clear solution (pH 10.8) is obtained. This solution is immediately freeze-dried to give impure, solid sodium 7-[(o-aminomethylphenylthio)acetamido]cephalosporanate.

We claim:
1. The compound of the formula

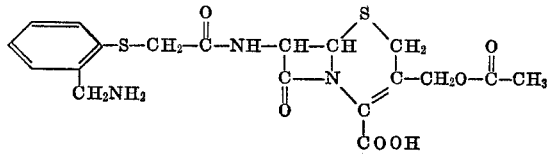

or a nontoxic, pharmaceutically acceptable salt thereof.
2. The compound of the formula

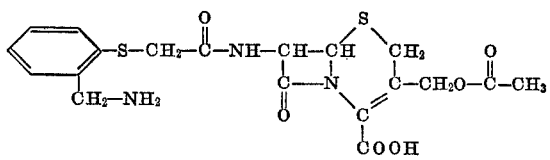

3. The sodium salt of the compound of claim 2.
4. The potassium salt of the compound of claim 2.
5. The hydrochloride of the compound of claim 2.
6. The zwitterion form of the compound of claim 2.
7. A nontoxic, pharmaceutically acceptable acid addition salt of the compound of claim 2.

References Cited

UNITED STATES PATENTS 3,422,100   1/1969   Crast _____ 260—243 C

NICHOLAS S. RIZZO, Primary Examiner

U.S. Cl. X.R.

424—246